United States Patent Office 3,804,951
Patented Apr. 16, 1974

3,804,951
EGG EXTENDER COMPOSITION AND PROCESS THEREFOR
Harold Rapp, Elkhart, Ind., assignor to Miles Laboratories, Inc., Elkhart, Ind.
No Drawing. Filed Oct. 1, 1971, Ser. No. 185,907
Int. Cl. A23j 3/02; A23l 1/04
U.S. Cl. 426—167   3 Claims

ABSTRACT OF THE DISCLOSURE

An egg extender composition which can be added to eggs for use in baking comprises the interrupted aqueous gel product containing kappa carrageenan, xanthan gum, locust gum and potassium salt. This product can be produced by rapidly cooling with agitation through a temperature range at which gelation will take place an aqueous mixture of the above constituents.

BACKGROUND AND PRIOR ART

Eggs, and particularly the yolks of eggs, are well-known constituents of many food products, especially baked goods. The egg whites provide a source of protein, which coagulates under the heat of baking to aid in formation of desirable structure, and the egg yolks provide a source of fat, which aids in the rising of leavened baked goods, as well as a source of flavoring. Since the eggs in a particular food composition can constitute a major amount of the raw material cost for such composition, efforts have been made in the past to produce a lower cost simulated egg composition which can be used as a total or partial replacement for eggs in food products.

Hydrocolloids, such as carrageenans, alginates and pectin, have been suggested in the prior art as partial replacements for egg yolks in custard food products, but such replacement was limited to a maximum of about 20 weight percent of the total egg yolks or dried egg solids.

It is an object of the present invention to provide an egg extender composition which can be employed as a substantial replacement for eggs in baked food products without appreciably affecting the desirable characteristics of such food products.

SUMMARY OF THE INVENTION

In accordance with the present invention an egg extender composition is provided which comprises the interrupted aqueous gel product containing kappa carrageenan, xanthan gum, locust gum and potassium salt. This product is produced by the process comprising rapidly cooling with agitation through a temperature range at which gelation will take place an aqueous mixture of kappa carrageenan, xanthan gum, locust gum and potassium salt.

DESCRIPTION OF THE INVENTION

The kappa carrageenan useful in the present invention is well-known and is commercially available from Irish moss or seaweed. It is primarily composed of alternating 3,6-anhydro-D-galactose and sulfated D-galactose units and is characterized by its sensitivity to metallic cations, such as potassium, ammonium, calcium and many other divalent and trivalent cations, to enhance its gel-forming properties.

The xanthan gum and locust gum are also well-known and are commercially available.

The potassium salt preferred for use in the present invention is potassium citrate, but any potassium salt acceptable for food use can be used. Exemplary potassium salts are potassium chloride, potassium sulfate, potassium acetate, potassium lactate, potassium malate, potassium tartrate and the like.

The final aqueous gel product contains from about 0.1 to about 0.5 percent kappa carrageenan, from about 0.2 to about 0.5 percent xanthan gum, from about 0.03 to about 0.3 percent locust gum, and from about 0.01 to about 0.3 percent potassium salt, said percentages being based on the total weight of the aqueous product. The preferred aqueous gel product composition contains about 0.22 percent kappa carrageenan, about 0.37 percent xanthan gum, about 0.078 percent locust gum and about 0.056 percent potassium salt, said percentages being based on the total weight of the aqueous product. The preferred product also contains from about 0.1 to about 4 weight percent of an opacifier or clouding agent, such as corn oil or starch, and minor amounts of yellow coloring, such as food grade coloring agents.

Kappa carrageenan is known to form brittle continuous gels in water. Brittle continuous gels are difficult to blend with other ingredients in baked goods compositions, for example, Flowable substances are more suitable. A flowable material is obtained in the present invention by providing an interrupted aqueous gel containing kappa carrageenan, xanthan gum, locust gum and a potassium salt. The xanthan gum and the locust gum modify the gel structure and the potassium salt enhances the gel formation by the kappa carrageenan.

The interrupted aqueous gel product of the present invention has been employed to replace from about 25 weight percent to about 45 weight percent of the total eggs in specific ingredient blends for baked goods with acceptable final baked product structure and taste. It has also been found that the inclusion of the egg extender improves the tenderness of the baked goods.

The invention will be described in further detail in the following examples.

EXAMPLE 1

A mixture of 0.22 weight part kappa carrageenan (commercially available under the trade name of Gelcarin GH from Marine Colloids, Inc.), 0.37 weight part xanthan gum, 0.078 weight part locust gum, 0.34 weight part corn oil, 0.021 weight part of a blend of F.D. & C. Yellow No. 5 and F.D. & C. Yellow No. 6 food grade coloring agents, 0.056 weight part potassium citrate and 98.9 weight parts water was heated to about 85° C. with stirring to dissolve the various constituents. The mixture was then cooled rapidly with agitation through the temperature range from about 50° C. to about 20° C. until the total mixture temperature reached about 20° C. In this manner an elastic interrupted gel was produced having an extremely high viscosity with a desirable "eggy" texture.

EXAMPLE 2

Yellow layer cakes (high egg level) were prepared using a control formulation containing eggs and with other formulations employing 25 weight percent and 33.3 weight percent replacement of eggs with the egg extender of Example 1. The specific formulations are listed below.

FORMULATIONS

| | Ingredients in weight parts | | |
|---|---|---|---|
| | Control | 25 percent replacement | 33.3 percent replacement |
| Ingredients: | | | |
| Flour | 295 | 295 | 295 |
| Sugar | 288 | 288 | 288 |
| Baking powder | 17.5 | 17.5 | 17.5 |
| Salt | 6.3 | 6.3 | 6.3 |
| Shortening | 95 | 95 | 71 |
| Milk | 245 | 145 | 245 |
| Flavoring | (¹) | (¹) | (¹) |
| Eggs | 150 | 112.5 | 100 |
| Egg extender | 0 | 37.5 | 50 |

¹ 6 milliliter.

The cakes baked with the control and 33.3 percent replacement formulations had the same overall volume while the cake baked with the 25 percent replacement formulation had a slightly smaller volume. The three cakes were stored at room temperature for one day and then evaluated by a seven-member taste panel. Two members of the panel rated the 25 percent replacement formulation as the best, four members rated the 33.3 percent replacement formulation as best and one member had no preference. None of the members rated the control as the best.

EXAMPLE 3

The egg extender of Example 1 was employed in various cake, cookie, brownie, cream filling, and pie formulations employing from about 25 to about 45 weight percent replacement of eggs with the egg extender. These products were evaluated by taste panels to indicate the best or first preference choices. The total evaluations are listed below.

FIRST PREFERENCES

| Control | Percent replacement of eggs | | | No preference |
|---|---|---|---|---|
| | 25 | 35 | 45 | |
| 16 | 21 | 14 | 2 | 14 |

It thus appears from the above data that use of the egg extender of the present invention enables products to be obtained which in 21 percent of the products are identical to "all-egg" products and in 55 percent of the products are considered superior to the "all-egg" products.

What is claimed is:

1. An egg extender composition consisting essentially of an interrupted aqueous gel product containing from about 0.1 to about 0.5 percent kappa carrageenan, from about 0.2 to about 0.5 percent xanthan gum, from about 0.03 to about 0.3 percent locust gum, and from about 0.01 to about 0.3 percent potassium salt, said percentages being based on the total weight of the aqueous product.

2. A composition according to claim 1 containing about 0.22 percent kappa carrageenan, about 0.37 percent xanthan gum, about 0.078 percent locust gum, about 0.056 percent potassium salt, about 0.34 percent corn oil, about 0.02 percent yellow coloring and about 98.9 percent water, said percentages being based on the total weight of the aqueous product.

3. A process for the production of the interrupted aqueous gel product of claim 1 which comprises heating an aqueous mixture of kappa carrageenan, xanthan gum, locust gum and potassium salt having the amounts set forth in claim 1 to a temperature sufficient to dissolve the various constituents followed by rapidly cooling the mixture with agitation through a temperature range from about 50° C. to about 20° C. until the total mixture temperature reaches about 20° C.

References Cited

UNITED STATES PATENTS

| 19,933 | 4/1936 | Epstein | 99—92 |
| 3,378,376 | 4/1968 | Sebring | 99—92 |
| 2,929,715 | 3/1960 | Sutton | 99—92 |
| 2,139,705 | 12/1938 | Tranin | 99—113 |
| 2,052,028 | 8/1936 | Harris | 99—113 |
| 3,658,556 | 4/1972 | Klein et al. | 99—131 |
| 3,557,016 | 1/1971 | Schuppner | 99—131 |

RAYMOND N. JONES, Primary Examiner

U.S. Cl. X.R.

426—156, 350